May 15, 1956     M. WULF     2,745,127

SOAP CONTAINING BRUSH

Filed April 15, 1953

INVENTOR.
Margaret Wulf
BY
Thos. J. Donnelly
ATTORNEY.

United States Patent Office 2,745,127
Patented May 15, 1956

2,745,127
SOAP CONTAINING BRUSH

Margaret Wulf, Detroit, Mich.

Application April 15, 1953, Serial No. 349,007

3 Claims. (Cl. 15—122)

My invention relates to a new and useful improvement in a soap containing brush adapted for insertion in water for washing various articles such as dishes and the like.

It is an object of the present invention to provide a brush of this class so arranged and constructed that a quantity of soap, either in powdered or small cake form, may be deposited in the brush and permitted contact with the water so that a suds may be easily and quickly provided and a detergent will always be present at the cleaning portion of the brush.

Another object of the invention is the provision of a brush of this class having a container or receptacle for receiving soap or similar detergent and provided with a plurality of openings through which water may flow and which may be adjusted to various sizes.

Another object of the invention is the provision of a brush of this class having a soap-containing receptacle with bristle-bearing members extending around the receptacle.

Other objects will appear hereinafter.

It is recognized that various modifications and changes may be made in the details of structure illustrated without departing from the invention, and it is intended that the present disclosure shall be considered but the preferred embodiment.

Figure 1:
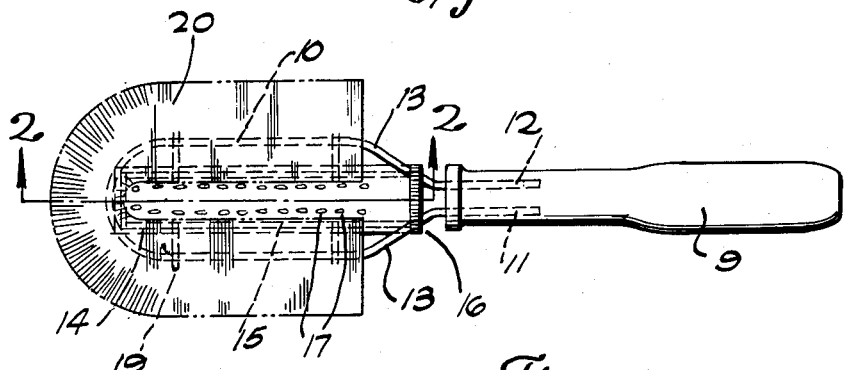
Figure 2:
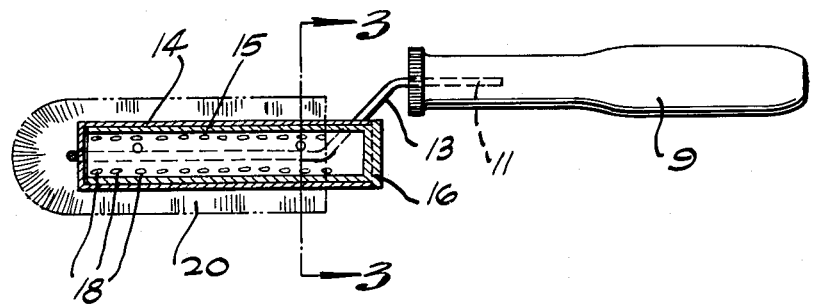
Figure 3:
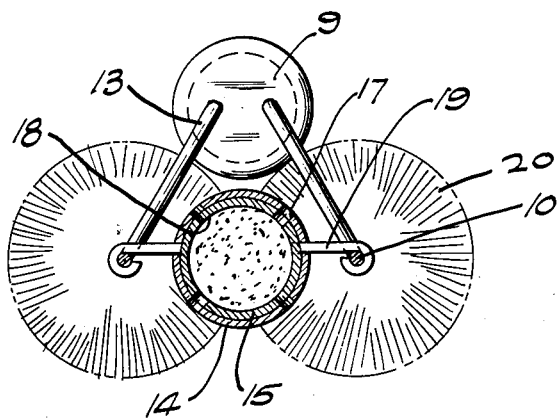

Forming a part of this application are drawings in which,

Fig. 1 is a plan view of the invention.
Fig. 2 is a sectional view taken on line 2—2 of Fig. 1.
Fig. 3 is a sectional view taken on line 3—3 of Fig. 2.

As shown in the drawings, the invention comprises a handle 9 extending forwardly from which is a wire loop 10, the ends 11 and 12 of which are imbedded in the forward end of the handle 9. This wire loop is provided with the angularly turned portions 13 so that the main body of the loop lies in a plane which is parallel to the axis of the handle, the handle thus being offset from the brush portion.

A receptacle for soap or the like is provided and embodies the outer casing 14 and the inner casing 15, this inner casing 15 having a head 16 which is knurled so that the inner casing may be rotated relative to the outer casing. Formed in the outer casing are openings 17 which may be brought into registration with the openings 18 formed in the inner casing. The inner casing may be removed from the outer casing and filled with soap powder or with small particles of cake soap or other suitable detergent. When the inner casing is inserted into the outer casing and a relative rotation effected so that the openings 17 and 18 are in registration, it is obvious that, when the container is dipped in water, the water will have access to the soap.

The outer casing 14 is secured by suitable cross bars 19 to the wire loop 10 so that the outer casing is held in fixed relation within the loop 10.

Mounted on this loop 10 so as to extend on 3 sides of the outer casing are bristles 20.

The construction is such that the soap contained within the receptacle will always be present when the brush is being used and will serve as a ready means for supplying suds to the water into which the brush may be dipped, while at the same time the bristles will serve as a means for cleansing through a rubbing action.

What I claim is:

1. A brush of the class described comprising a handle; an elongated wire loop mounted at one end on said handle and projecting forwardly therefrom and lying in a plane off-set from and parallel to a plane of the longitudinal axis of said handle; a receptacle embodying an outer casing secured to said loop and positioned within the same; said outer casing being formed with openings therethrough; an inner casing rotatably mounted in said outer casing and having openings formed therein for registration with the openings formed in said outer casing, and movable out of registration therewith upon relative rotation of said casings; and bristles mounted on said loop and embracing said receptacle on opposite sides and the forward end thereof.

2. A brush of the class described comprising a handle forming portion; an elongated wire loop secured at one end to the forward end of said handle forming portion and projecting forwardly therefrom; an elongated receptacle embodying an outer casing; connecting bars secured at one end of said outer casing and projecting outwardly therefrom and connected to said loop for mounting said outer casing within said loop; said outer casing being formed with openings therethrough; an inner casing rotatably mounted in said outer casing and having openings formed therein for registration with the openings formed in said outer casing and movable out of registration therewith upon relative rotation of said casings; and bristles mounted on said loop and embracing said receptacle on opposite sides and the forward end thereof.

3. A brush of the class described comprising a handle forming portion; an elongated wire loop secured at one end to the forward end of said handle forming portion and projecting forwardly therefrom; an elongated receptacle embodying an outer casing; connecting bars secured at one end of said outer casing and projecting outwardly therefrom and connected to said loop for mounting said outer casing within said loop; said outer casing being formed with openings therethrough; an inner casing rotatably mounted in said outer casing and having openings formed therein for registration with the openings formed in said outer casing and movable out of registration therewith upon relative rotation of said casings; and bristles mounted on said loop and embracing said receptacle on opposite sides and the forward end thereof; said connecting bars retaining said receptacle in spaced relation to the sides of said loop.

References Cited in the file of this patent

UNITED STATES PATENTS

| Number | Name | Date |
|---|---|---|
| 929,947 | Hertzberg | Mar. 3, 1909 |
| 1,423,992 | Brown | July 25, 1922 |
| 1,926,728 | Lamb | Sept. 12, 1933 |
| 1,993,599 | Dorn | Mar. 5, 1935 |
| 2,336,717 | Crimmins | Dec. 14, 1943 |
| 2,673,998 | Swartz | Apr. 6, 1954 |

FOREIGN PATENTS

| 110,914 | Switzerland | July 16, 1925 |